(12) United States Patent
Della Corte et al.

(10) Patent No.: US 10,956,252 B2
(45) Date of Patent: *Mar. 23, 2021

(54) ANOMALY DETECTION IN PERFORMANCE MANAGEMENT (71) Applicant: INTERNATIONAL BUSINESS MACHINES CORPORATION, Armonk, NY (US)

(72) Inventors: Gianluca Della Corte, Rome (IT); Leonida Gianfagna, Rome (IT); Stefano Proietti, Rome (IT); Roberto Pecoraro, Montecorvino Pugliano (IT); Antonio M. Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/197,498

(22) Filed: Nov. 21, 2018

(65) Prior Publication Data
US 2019/0087257 A1   Mar. 21, 2019

Related U.S. Application Data (63) Continuation of application No. 15/214,917, filed on Jul. 20, 2016, now Pat. No. 10,223,191.

(51) Int. Cl.
G06F 11/00 (2006.01)
G06F 11/07 (2006.01)
G06F 11/34 (2006.01)

(52) U.S. Cl.
CPC ........ G06F 11/079 (2013.01); G06F 11/3452 (2013.01)

(58) Field of Classification Search
CPC ............... G06F 11/079; G06F 11/0706; G06F 11/0751; G06F 11/0787; G06F 11/30;
(Continued)

(56) References Cited

U.S. PATENT DOCUMENTS 8,862,727 B2   10/2014   Jayachandran et al.
8,924,333 B2   12/2014   Biem
(Continued)

FOREIGN PATENT DOCUMENTS

WO   2013/072232   5/2013

OTHER PUBLICATIONS

List of IBM Patents or Patent Applications Treated as Related dated Nov. 21, 2018, 2 pages.
(Continued)

Primary Examiner — Joseph D Manoskey
(74) Attorney, Agent, or Firm — Tutunjian & Bitetto, P.C.; Scott Dobson (57) ABSTRACT Methods and systems for detecting anomalous behavior include performing a principal component analysis on a plurality of key performance indicators (KPIs) to determine a set of principal axes. The KPIs are clustered in a space defined by the set of principal axes. Local anomalies are determined in the clustered KPIs by comparing, for each individual KPI in clusters that conform to a Gaussian distribution, a distance from a respective cluster mean to a threshold. Structural anomalies are determined in the clustered KPIs. The structural and local anomalies are classified based on historical information. A management action is performed based on the classified structural and local anomalies.

15 Claims, 7 Drawing Sheets (58) Field of Classification Search
CPC ............... G06F 11/302; G06F 11/3065; G06F 11/3072; G06F 11/3452
See application file for complete search history.

(56) References Cited

U.S. PATENT DOCUMENTS

| | | | |
|---|---|---|---|
| 9,210,181 | B1 | 12/2015 | Nandy et al. |
| 2010/0071061 | A1* | 3/2010 | Crovella ................. H04L 43/16 726/23 |
| 2013/0073260 | A1 | 3/2013 | Maeda et al. |
| 2014/0310235 | A1* | 10/2014 | Chan ................... G06F 11/3003 707/603 |
| 2015/0379357 | A1 | 12/2015 | Datta et al. |
| 2016/0104076 | A1* | 4/2016 | Maheshwari .......... G06N 20/00 706/12 |
| 2016/0147585 | A1* | 5/2016 | Konig .................... G06F 16/20 714/37 |
| 2016/0350173 | A1* | 12/2016 | Ahad .................. G06F 11/3072 |
| 2017/0104657 | A1* | 4/2017 | Gopalakrishnan ..... G06K 9/622 |
| 2017/0124502 | A1* | 5/2017 | Brew ..................... H04L 67/42 |

OTHER PUBLICATIONS

Thomas J. Veasey et al., Anamoly Detection in Application Performance Monitoring Data, International Journal of Machine Learning and Computing 4.2 (Aug. 2013).

Song Fu, Performance metric selection for autonomic anomaly detection on cloud computing systems. Global Telecommunications Conference (GLOBECOM 2011), Dec. 2011 IEEE.

* cited by examiner

ANOMALY DETECTION IN PERFORMANCE MANAGEMENT

BACKGROUND

Technical Field

The present invention generally relates to performance management and, more particularly, to the detection of anomalous behavior in large systems with many tracked variables.

Description of the Related Art

Operation analytics takes various metrics of system performance and automatically analyzes the information to determine whether the system is behaving normally. As systems grow larger, however, the number of variables to be tracked to perform such analytics grows as well and can rapidly become unmanageable.

Existing analytics systems perform clustering of key performance indicators (KPIs) and detect anomalies by the divergence of KPI points from clusters. However, simple clustering of the raw KPIs is problematic in a "big data" environment. Such a system may involve millions of KPIs, each of which represents a different dimension. The underlying noise generated by so many KPIs does not contain meaningful information but can generate strong "false positive" signals. Furthermore, identifying anomalies based on a pure "distance" analysis, without applying any temporal information, causes normal operation to be treated as an anomaly.

SUMMARY

A method for detecting anomalous behavior includes performing a principal component analysis on a plurality of key performance indicators (KPIs) to determine a set of principal axes. The KPIs are clustered in a space defined by the set of principal axes. Local anomalies are determined in the clustered KPIs by comparing, for each individual KPI in clusters that conform to a Gaussian distribution, a distance from a respective cluster mean to a threshold. Structural anomalies are determined in the clustered KPIs. The structural and local anomalies are classified based on historical information. A management action is performed based on the classified structural and local anomalies.

A system for detecting anomalous behavior includes a detection module that has a processor configured to perform a principal component analysis on a plurality of key performance indicators (KPIs) to determine a set of principal axes, to cluster the KPIs in a space defined by the set of principal axes, to determine local anomalies in the clustered KPIs by comparing, for each individual KPI in clusters that conform to a Gaussian distribution, a distance from a respective cluster mean to a threshold, and to determine structural anomalies in the clustered KPIs. A classification module is configured to classify the structural and local anomalies based on historical information. A management module is configured to perform a management action based on the classified structural and local anomalies.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide operation analytics that perform pre-processing on big data key performance indicators (KPIs) before clustering to reduce the dimensionality of the data set. The present embodiments then perform a two-step anomaly detection, first detecting whether an entire cluster of KPIs is anomalous, and second detecting whether individual points within a given cluster of KPIs are anomalous.

To reduce the dimensionality, a step of principal component analysis (PCA) is used on the KPIs, taking the potentially millions of dimensions and reducing them to a small number of linearly uncorrelated "principal component" dimensions that characterize the many original dimensions without loss of information. The data is then clustered in the principal component dimensions and distance calculations are made to determine whether particular clusters and particular points within those clusters represent deviations from expected behavior.

Figure 1:
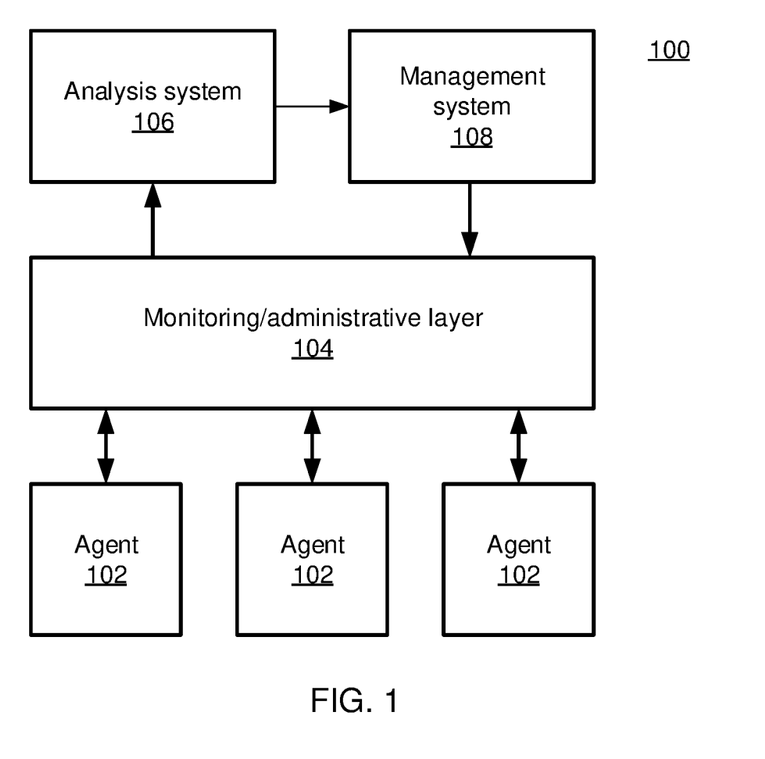
FIG. 1 is a block diagram of a system under performance monitoring in accordance with the present principles.

Referring now to FIG. 1, a monitored system 100 is shown. The system 100 includes a number of agents 102. These agents may be any sort of monitored or managed device which, by a computer network or by some other form of communication, provide information regarding their performance to a monitoring/administrative layer 104. Each variable that is tracked and reported by the agents 102 is referred to herein as a key performance indicator (KPI). Across a large network there may be thousands or even millions of different agents 102, each providing a set of KPIs that reflect the performance of that respective agent 102.

The monitoring/administrative layer 104 collects the KPIs from the various agents 102 and provides them to an analysis system 106. The analysis system 106 analyzes the KPIs, both at the present moment and in view of historical behavior, to determine whether particular KPIs and whether global system performance is anomalous. The analysis system 106 provides this information to management system 108 which, in turn provides instructions through the monitoring/administrative layer 104 to the agents 102.

The management system 108 may include automatic network/system administration tools and may also include feedback to and instructions from a human administrator. In one specific embodiment, where the system 100 includes a software defined networking system and where the monitoring/administrative layer 104 includes, e.g., OpenFlow switches that may be controlled remotely, the management system 108 may issue commands to individual agents 102 or to the components of the network to change the behavior of the agents 102 or the network in response to anomalous system behavior.

It should be understood that the monitoring/administrative layer 104, the analysis system 106, and the management system 108 may be implemented centrally, for example at one specific device, or may be implemented as part of a distributed or "cloud" computing system.

Figure 2:
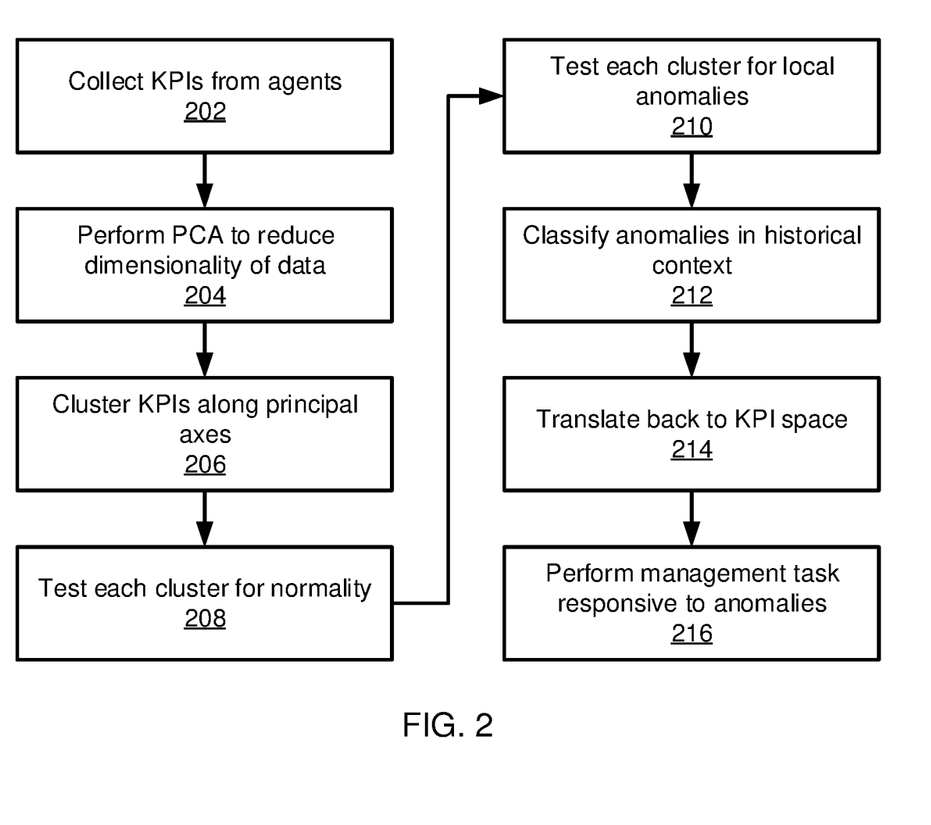
FIG. 2 is a block/flow diagram of a method for detecting and responding to local, global, and structural system performance anomalies in accordance with the present principles.

Referring now to FIG. 2, a method of detecting and responding to anomalies in system performance is shown. Block 202 collects the KPIs from the various agents 102 using the monitoring/administrative layer 104. As noted above, there may be many KPIs, such that treating each KPI as a separate dimension may be prohibitive, both in computational effort needed to perform clustering and in the sensitivity of such an analysis to noise. As such, block 204 performs a principal component analysis (PCA) to reduce the dimensionality of the problem. In one example, PCA may be used to reduce the potentially millions of dimensions from all of the KPIs down to two principal axes, which represent eigenvectors of a PCA matrix.

Block 206 then clusters the KPIs along the principal axes determined by block 204. It is specifically clustering that a k-means clustering process may be used to perform the clustering of block 206, but it should be understood that clustering may instead be performed according to any appropriate clustering process. If k-means is used, the number of clusters k may be selected by iteratively searching the k-means cost function to locate a number of clusters beyond which adding another cluster will not significantly improve the average distance of KPI points from each cluster center.

Block 208 tests each cluster in PCA-space for normality, under the assumption that a natural distribution of a large number of independent, identically distributed variables will be approximately Gaussian, according to the central limit theorem. It should be understood that the term "normal" is used herein in the statistical sense, to refer to a Gaussian distribution, whereas "anomalous" and "non-anomalous" are used to refer to whether the behavior of the system is potentially problematic or is as expected. The distance of points is measured from the cluster mean. Each cluster represents a sort of global state where all of the constituent KPIs are fluctuating normally around their respective means. Thus the cluster itself may present an unexpected deviation from a normal distribution, which may represent a system anomaly. This deviation from a normal distribution is referred to herein as a structural anomaly, which indicates that something is pushing the system 100 out of a normal Gaussian equilibrium.

Thus block 208 performs a normality test on each cluster to find a p value. The p value represents the likelihood that the cluster under test would occur if it were sampled from a Gaussian distribution. A small p value (e.g., below about 0.05) strongly indicates that such a natural occurrence is unlikely and that the cluster has a structural anomaly.

Block 210 then tests individual KPI points within each normal cluster to identify local anomalies. Each KPI represents a point in the PCA space defined by the principal axes. Block 210 measures the distance of each KPI point from the mean of its respective cluster. The distance is measured in standard deviations from the mean, with higher distances representing a greater likelihood of anomalous behavior. Block 210 identifies such points based on a comparison of the points' distances to one or more thresholds. In one example, a first threshold is at three standard deviations and a second threshold is at five standard deviations, with points being classified differently depending on which threshold they exceed. It should be understood that other thresholds may be employed in accordance with the particular application and system being monitored.

Block 212 classifies the anomalies detected by blocks 208 and 210. With respect to potential structural anomalies identified by block 208, the identified non-normal cluster is compared to historical data of KPIs in the same neighborhood in PCA-space to determine if the system also behaved non-normally in the past. If so, this cluster may represent non-anomalous behavior. Block 212 therefore reclassifies the anomaly as an "informational message" which many be provided to the management system 108 about the cluster. Otherwise, the structural anomaly is confirmed and provided to the management system 108 for review.

For the local anomalies detected by block 210, block 212 classifies the anomalies according to distance from the mean of their respective clusters and historical data. If the point is an isolated outlier from other KPIs (i.e., distant from other KPIs in PCA-space), this indicates that the system had a large deviation from normal behavior, but that the deviation was so limited in time that it does not merit further analysis as it did not affect the system otherwise. In this case, the anomaly is classified as an informational anomaly.

If a KPI point is not isolated, block 212 checks the system at previous sampling time (e.g., $t=t_{n-1}$). If the previous point performed inside the three standard deviation threshold, this indicates an abrupt change that drove the KPI in question from a small deviation (<3 standard deviations) to a large deviation (>5 standard deviations). This is classified as a significant anomaly.

If the point is not isolated, but there is a smooth trend when considering historical information that drives the KPI from points within three standard deviations to points toward five standard deviations, then the anomaly is classified as a warning anomaly. In addition, any points between the thresholds (e.g., between three and five standard deviations) are classified as warning anomalies.

If an anomaly, either a structural anomaly or an isolated anomaly, occurs in a cyclic fashion, block 212 classifies the anomaly as being periodic. This may represent, for example, a seasonal pattern that should not be marked as a different anomaly each time it occurs.

Block 214 translates the classified anomaly back to KPI space to determine which events occurred during the time in which the system deviated from normal behavior. Thus the PCA space, which transformed space determined by:

$$FinalData = RowFeatureVector \times RowDataAdjust$$

can be transformed back using, e.g.:

$$RowDataAdjust = RowFeatureVector^{-1} \times FinalData.$$

The anomalies can thus be identified in the original dataset. If an anomaly occurs across multiple different time series at the same time, it may be classified as a global anomaly, otherwise it may be classified as a local anomaly. A global anomaly can generate high severity alarms relative to local anomalies.

Once the anomalies have been classified by blocks 212 and 214 and have been reported, block 216 performs one or more management tasks responsive to the anomalies. In the simplest case, this may include providing an alert to a human operator who may then, in turn, perform an appropriate management task to resolve the anomaly. However, automatic responses to the anomalies are also contemplated, such as the generation of a ticket in a ticketing system or the triggering of automatic mitigation processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
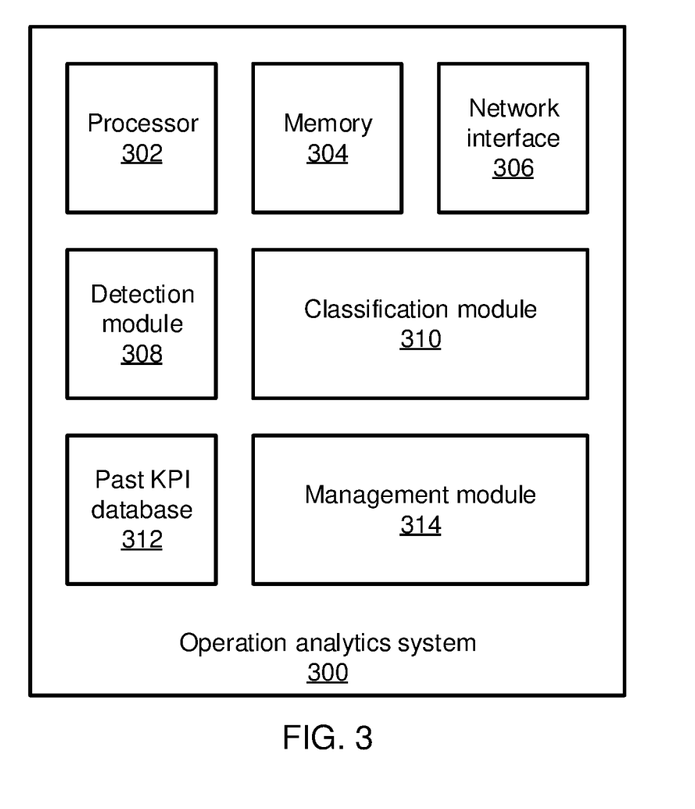
FIG. 3 is a block diagram of a system for detecting and responding to local, global, and structural system performance anomalies in accordance with the present principles.

Referring now to FIG. 3, an operation analytics system 300 is shown. The operation analytics system 300 includes a hardware processor 302 and memory 304. A network interface 306 provides access to the network and, thereby, to the agents 102. In addition, the operation analytics system 300 includes one or more functional modules. The functional modules may be implemented as software that is stored in memory 304 and executed by hardware processor 302. In an alternative embodiment, the functional modules may be implemented as one or more discrete hardware components.

In particular, a detection module 308 collects the KPIs from the agents 102, performs a PCA to reduce the dimensionality of the dataset, performs clustering on the KPIs in PCA-space, and determines when clusters or individual points are anomalous as described above. A classification module 310 then classifies the potential anomalies detected by the detection module 308, in particular using historical information from a database 312 of past PKIs. The classified anomalies are then passed to management module 314, which determines a course of action to take based on the anomalies. It should be understood that the monitoring/administrative layer 104, the analysis system 106, and the management system 108 may be incorporated into a single device in the operational analytics system 300 or may, alternatively, be formed as multiple discrete devices.

Figure 4:
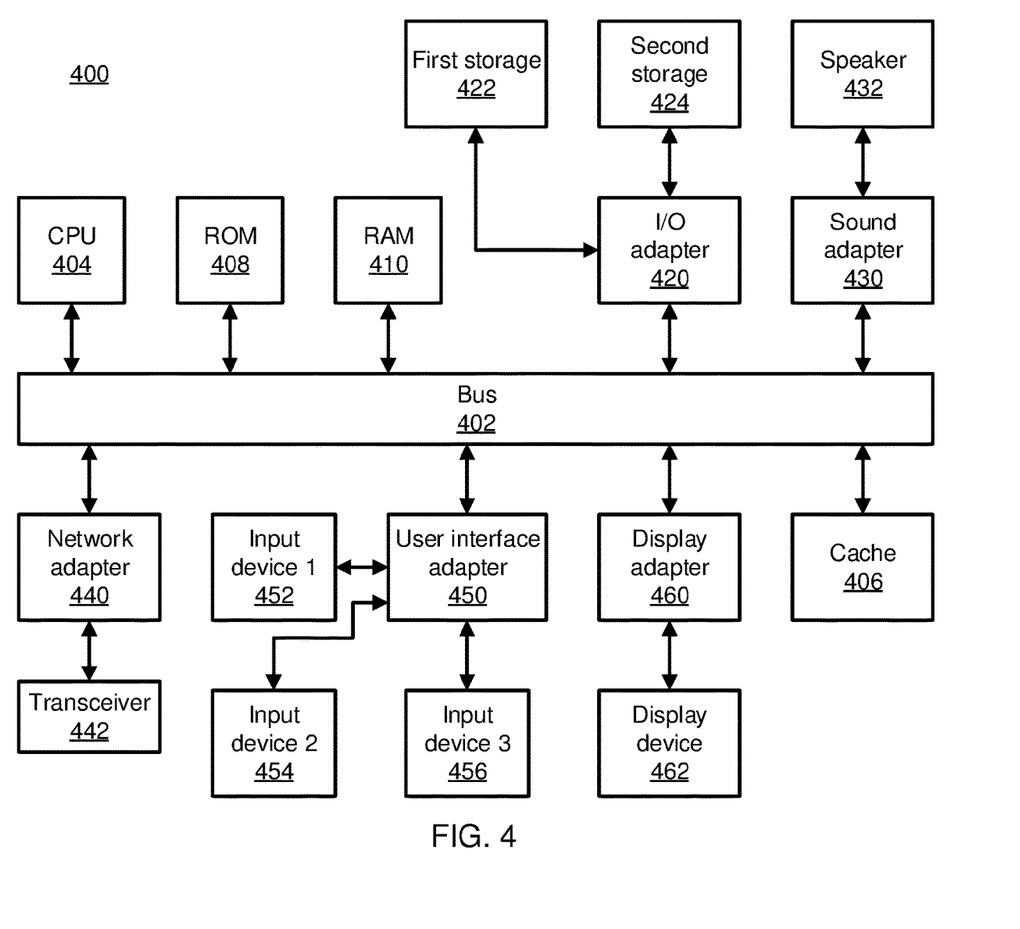
FIG. 4 is a block diagram of a processing system in accordance with the present principles.

Referring now to FIG. 4, an exemplary processing system 400 is shown which may represent the transmitting device 100 or the receiving device 120. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
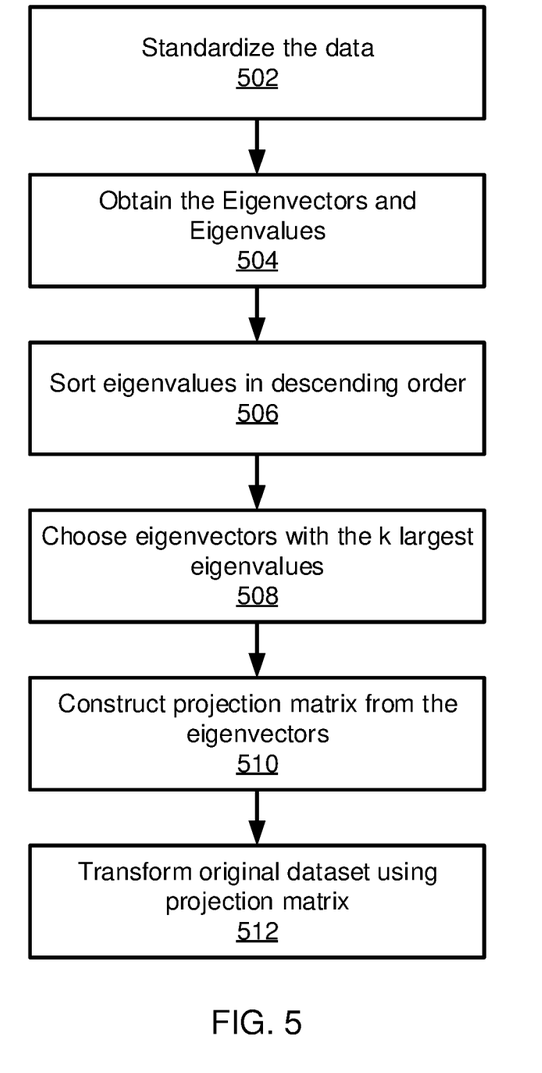
FIG. 5 is a block/flow diagram of a method for performing principal component analysis in accordance with the present principles.

Referring now to FIG. 5, additional detail on the PCA of block 204 is shown. Block 502 standardizes the data, which is represented by an original dataset X. Block 504 obtains eigenvectors and eigenvalues of the original dataset from, e.g., a covariance matrix or correlation matrix. Alternatively, block 504 may perform singular vector decomposition.

Block 506 sorts the eigenvalues and their corresponding eigenvectors in descending order. Block 508 chooses the k eigenvectors that correspond to the k largest eigenvalues. The value k then represents the dimensions of the PCA-space. Block 510 constructs a projection matrix W from the selected eigenvectors and block 512 performs a transformation on the original dataset X using W to obtain the k-dimensional PCA subspace.

Figure 6:
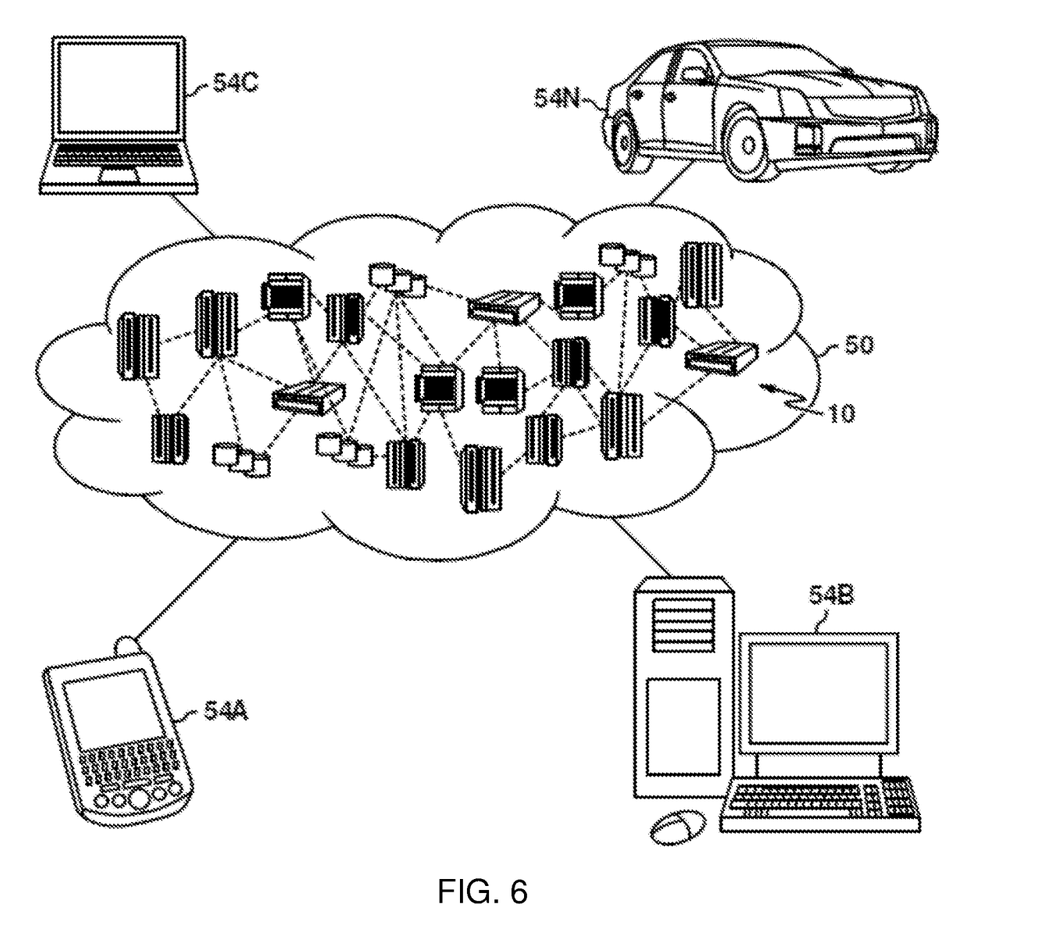
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
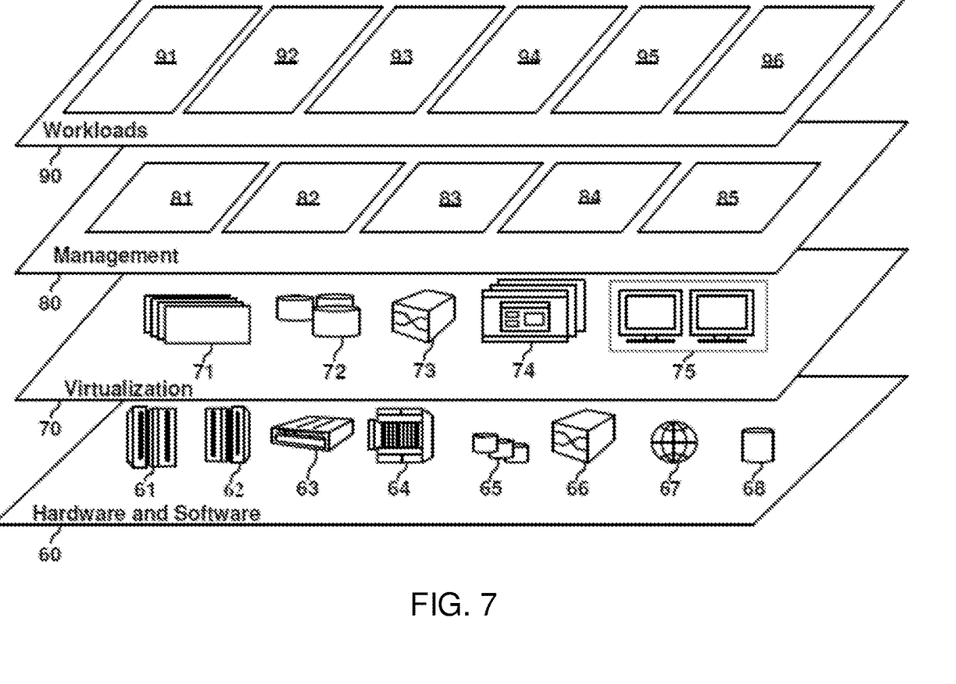
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance monitoring 96.

Having described preferred embodiments of anomaly detection in performance management (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for detecting anomalous behavior, comprising:
    performing a principal component analysis on a plurality of key performance indicators (KPIs) to determine a set of principal axes;
    clustering the KPIs in a space defined by the set of principal axes;
    determining local anomalies in the clustered KPIs by comparing, for each individual KPI in clusters that conform to a Gaussian distribution, a distance from a respective cluster mean to a threshold;
    determining structural anomalies in the clustered KPIs;
    classifying the structural and local anomalies based on historical information; and
    performing a management action based on the classified structural and local anomalies.

2. The method of claim 1, wherein determining structural anomalies comprises determining how closely each cluster of KPIs conforms to a Gaussian distribution.

3. The method of claim 1, wherein classifying structural anomalies comprises determining whether a cluster that does not conform to a Gaussian distribution conformed to a Gaussian distribution at a previous time.

4. The method of claim 1, wherein classifying local anomalies comprises determining whether a KPI is an isolated outlier.

5. The method of claim 4, wherein classifying local anomalies comprises determining whether the KPI has gone from a distance below a first threshold at a previous sampling time to a current distance that is above a second, higher threshold.

6. The method of claim 4, wherein classifying local anomalies comprises determining whether there is a trend across multiple previous sampling times from a distance below a first threshold toward a second, higher threshold.

7. The method of claim 1, further comprising transforming from a space based on the principal axes to an original space and determining whether each of the local and structural anomalies is a global anomaly or a local anomaly.

8. A non-transitory computer readable storage medium comprising a computer readable program for detecting anomalous behavior, wherein the computer readable program when executed on a computer causes the computer to perform the steps of:
    performing a principal component analysis on a plurality of key performance indicators (KPIs) to determine a set of principal axes;
    clustering the KPIs in a space defined by the set of principal axes;
    determining local anomalies in the clustered KPIs by comparing, for each individual KPI in clusters that conform to a Gaussian distribution, a distance from a respective cluster mean to a threshold;
    determining structural anomalies in the clustered KPIs;
    classifying the structural and local anomalies based on historical information; and
    performing a management action based on the classified structural and local anomalies.

9. A system for detecting anomalous behavior, comprising:
    a detection module comprising a processor configured to perform a principal component analysis on a plurality of key performance indicators (KPIs) to determine a set of principal axes, to cluster the KPIs in a space defined by the set of principal axes, to determine local anomalies in the clustered KPIs by comparing, for each individual KPI in clusters that conform to a Gaussian distribution, a distance from a respective cluster mean to a threshold, and to determine structural anomalies in the clustered KPIs;

a classification module configured to classify the structural and local anomalies based on historical information; and a management module configured to perform a management action based on the classified structural and local anomalies.

10. The system of claim 9, wherein the detection module is further configured to determine how closely each cluster of KPIs conforms to a Gaussian distribution.

11. The system of claim 10, wherein the classification module is further configured to determine whether a cluster that does not conform to a Gaussian distribution conformed to a Gaussian distribution at a previous time.

12. The system of claim 9, wherein the classification module is further configured to determine whether a KPI is an isolated outlier.

13. The system of claim 12, wherein the classification module is further configured to determine whether the KPI has gone from a distance below a first threshold at a previous sampling time to a current distance that is above a second, higher threshold.

14. The system of claim 12, wherein the classification module is further configured to determine whether there is a trend across multiple previous sampling times from a distance below a first threshold toward a second, higher threshold.

15. The system of claim 9, wherein the classification module is further configured to transform from a space based on the principal axes to an original space and to determine whether each of the local and structural anomalies is a global anomaly or a local anomaly.

* * * * *